United States Patent
Nabhane et al.

(10) Patent No.: US 10,383,021 B2
(45) Date of Patent: *Aug. 13, 2019

(54) SATELLITE CHANNEL AND LTE COEXISTENCE

(71) Applicant: Avago Technologies International Sales Pte. Limited, Singapore (SG)

(72) Inventors: Walid Nabhane, Long Valley, NH (US); Xiaoxin Qiu, Basking Ridge, NJ (US); Jason C. Demas, Irvine, CA (US); Pascal G. Finkenbeiner, Torrance, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/024,610

(22) Filed: Jun. 29, 2018

(65) Prior Publication Data

US 2018/0317149 A1 Nov. 1, 2018

Related U.S. Application Data

(63) Continuation of application No. 15/076,156, filed on Mar. 21, 2016, now Pat. No. 10,021,615.

(60) Provisional application No. 62/297,028, filed on Feb. 18, 2016.

(51) Int. Cl.
*H04W 72/04* (2009.01)
*H04W 36/20* (2009.01)
*H04W 36/28* (2009.01)
*H04W 16/14* (2009.01)

(52) U.S. Cl.
CPC ........... *H04W 36/20* (2013.01); *H04W 36/28* (2013.01); *H04W 72/0453* (2013.01); *H04W 16/14* (2013.01)

(58) Field of Classification Search
CPC ..... H04W 36/20; H04W 72/04; H04W 36/28; H04W 16/14
See application file for complete search history.

(56) References Cited

U.S. PATENT DOCUMENTS

| | | |
|---|---|---|
| 2012/0034912 A1 | 2/2012 | Kamdar et al. |
| 2012/0036541 A1 | 2/2012 | Kotecha et al. |
| 2012/0036641 A1 | 2/2012 | Hasan et al. |
| 2012/0042345 A1 | 2/2012 | Tjio et al. |

(Continued)

OTHER PUBLICATIONS

U.S. Office Action on U.S. Appl. No. 15/076,156 dated Sep. 8, 2017, 6 pages.

*Primary Examiner* — Chi Ho A Lee
(74) *Attorney, Agent, or Firm* — Foley & Lardner LLP (57) ABSTRACT

Systems and methods of handling satellite channel and LTE coexistence are provided. A first device can identify at least one first frequency band. The first device can determine that at least one second frequency band of a plurality of second frequency bands overlaps with the at least one first frequency band. In response to determining that the at least one second frequency band overlaps with the at least one first frequency band, the first device transmits a message including an identifier of the first device and an indication of the at least one second frequency band to a second device. The second device receives the message. The second device, in response to receiving a channel request from the first device, allocates, from the plurality of second frequency bands, a second frequency band different from the at least one second frequency band.

20 Claims, 6 Drawing Sheets

(56) References Cited

U.S. PATENT DOCUMENTS

| | | |
|---|---|---|
| 2013/0055316 A1 | 2/2013 | Brisebois et al. |
| 2013/0212615 A1 | 8/2013 | Schultz |
| 2014/0071908 A1 | 3/2014 | Sachs et al. |
| 2015/0264566 A1 | 9/2015 | Melia et al. |
| 2016/0073310 A1 | 3/2016 | Hapsari et al. |
| 2016/0380779 A1 | 12/2016 | Sharma et al. |
| 2017/0142592 A1 | 5/2017 | Fischer et al. |
| 2017/0150506 A1 | 5/2017 | Mitsui et al. |

SATELLITE CHANNEL AND LTE COEXISTENCE

CROSS-REFERENCE TO RELATED APPLICATIONS

This application is a continuation of and claims priority to and the benefit of U.S. patent application Ser. No. 15/076,156, entitled "Satellite Channel and LTE Coexistence," filed Mar. 21, 2016, which claims priority to and the benefit of U.S. Provisional Application No. 62/297,028, entitled "Satellite Channel and LTE Coexistence," filed Feb. 18, 2016, the contents of which are incorporated herein by reference in their entirety for all purposes.

BACKGROUND

Satellite television viewers receive television programming via satellite antennas that receive satellite signals from satellites. A satellite antenna is generally placed on the exterior of a home or other structure and transmits the received satellite signals via an Out Door Unit (ODU) to a receiver such as a set-top box (STB). With the development of the Long-Term Evolution (LTE) technology, the LTE technology has been added to the satellite STBs to allow operators to use the LTE network for communicating information and to offer additional services to end users.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various implementations of the methods and systems are set forth in the accompanying drawings and the description below.

DETAILED DESCRIPTION

Following below are more detailed descriptions of various concepts related to, and implementations of, methods, apparatuses, and systems of handling the coexistence between satellite channels and LTE frequency bands. Before turning to the more detailed descriptions and figures, which illustrate the exemplary implementations in detail, it should be understood that the application is not limited to the details or methodology set forth in the descriptions or illustrated in the figures. It should also be understood that the terminology is for the purpose of description only and should not be regarded as limiting.

The present disclosure is directed generally to systems and methods of handling coexistence between satellite channels and LTE frequency bands. For satellite set-top boxes having LTE modules (e.g., a LTE universal serial bus (USB) dongle or a LTE transceiver integrated into the set top box), interference could occur when the LTE frequency bands used by the LTE module overlap with the transponder frequency bands allocated by the ODU connected to the satellite antenna.

Figure 1:
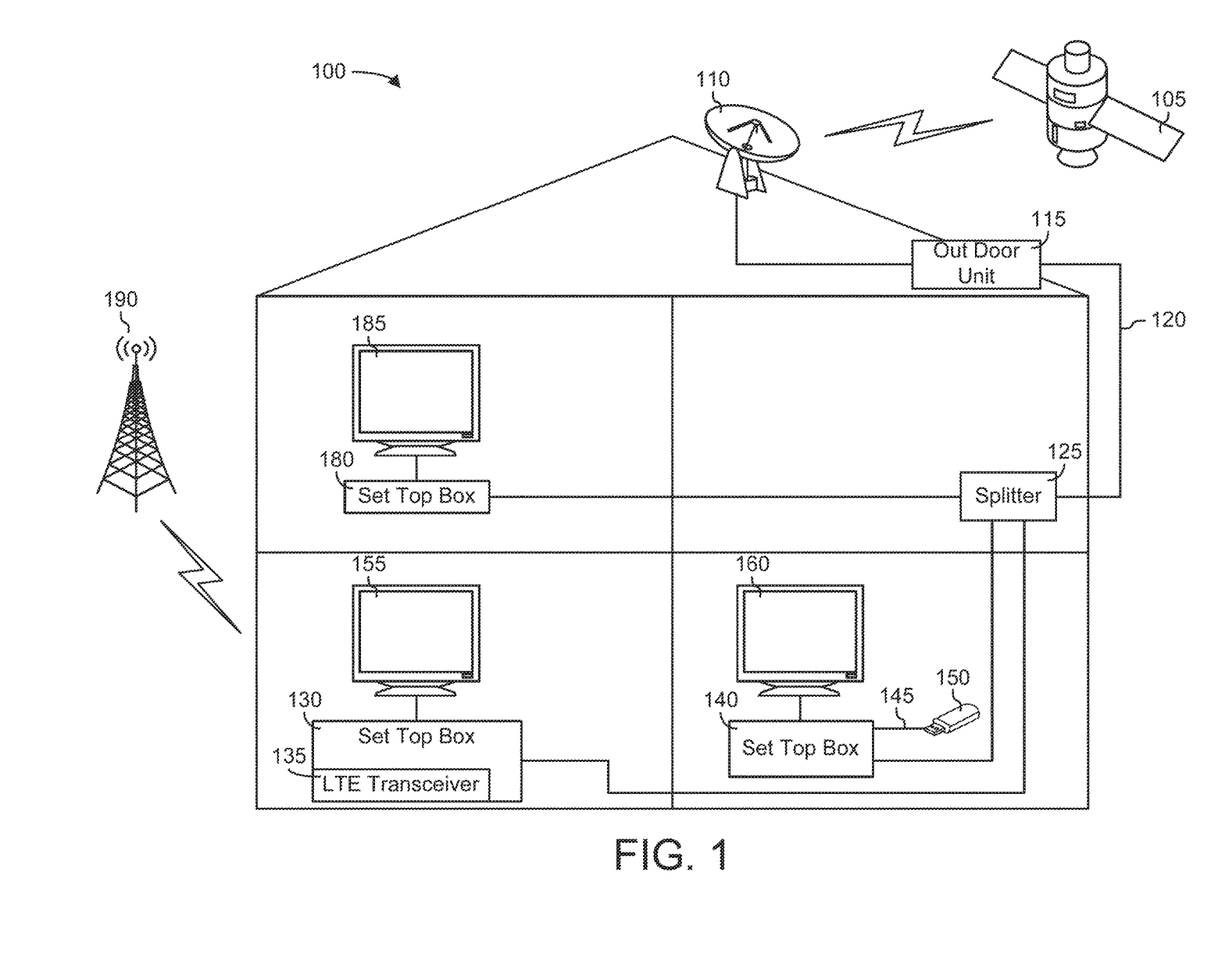
FIG. 1 is a block diagram depicting an example system of handling satellite channel and LTE coexistence, according to an illustrative implementation.

FIG. 1 is a block diagram depicting an example system 100 of handling satellite channel and LTE coexistence. In brief overview, the system 100 includes an ODU 115 connected a satellite antenna 110 for receiving satellite signals from a satellite 105. The ODU 115 is connected to one or more indoor receivers (e.g., STBs 130, 140, 180) via a cable 120, such as a coaxial cable or other type of cable connection. Each of the STBs 130, 140, 180 is connected to a display device 155, 160, 185, such as a TV. One or more of the set-top boxes 130, 140, 180 can have a LTE module 135 or 150 and therefore can transmit to and receive LTE signals from the base station 190.

The satellite antenna 110 can receive satellite signals operating in transponder frequency bands (or satellite frequency bands) from the satellite 105 via a one-way downlink wireless connection. In some implementations, the satellite antenna 110 can receive signals with multiple Gigahertz (GHz) of bandwidth. In these implementations, the ODU 115 takes the high frequency downlink signals and converts them into signals of 1 to 2 GHz band suitable for the cable 120 (e.g., a coaxial cable). In some implementations, the satellite antenna 110 receives signals of 11 GHz, 12 GHz or other bands and the ODU converts them into signals of 1 to 2 GHz or other bands. Hereinafter, the reruns "transponder frequency band," "satellite frequency band," and "satellite channel" are used interchangeably and generally have the same meaning. The term "TV channel" refers to a single program/content service, such as CNN®, ESPN®, etc.

The ODU 115 can include suitable logic, circuitry, interfaces, and/or code configured to convert the received satellite signals into signals of different frequencies. The conversion is performed because the received signals are to be transmitted by a cable (e.g., the coaxial cable 120) to an indoor receiver (e.g., the STBs 130, 140, 180) and the frequency is limited by the bandwidth of the cable. In some implementations, a coaxial cable is used and the bandwidth may be limited to 1 to 2 GHz. In other implementations, different cables can be used and the bandwidth is limited to different ranges. In some implementations, the ODU 115 includes a converter, one or more interfaces, one or more processors/controllers, among other components for performing the frequency conversion and other operations, including the operations as described herein below. In some implementations, circuitry of the ODU 115 can perform the operations described herein. In some implementations, one or more processors of the ODU 115 can execute instructions stored in non-transitory computer-readable storage media to perform operations described herein. The processors can be one or more microprocessors, CPUs, application specific integrated circuits (ASICs) and/or one or more other integrated circuits.

The cable 120 can include one or more coaxial or other cable segments, and can include any number of switches, amplifiers, couplers to inter-connect cable or other components. The cable 120 can connect the ODU 115 with one or more STBs. In the case that the ODU 115 is connected with multiple STBs, a splitter 125 can be used to split the signals among the multiple STBs. The signals transmitted from the ODU 115 to the multiple STBs can be modulated on separate carrier frequencies.

The STBs 130, 140, 180 can include suitable logic, circuitry, interfaces, and/or code configured to receive converted signals from the ODU 115 via the cable 120. The STBs 130, 140, 180 can include various components for processing, decrypting, decoding, and presenting the video, audio and data streams to the display devices or TVs 155, 160, 185. The STBs and the TVs can be connected via wired connection or wireless network connections. For example, the connections can be coaxial cable, BNC cable, fiber optic cable, composite cable, s-video, DVI, HDMI, component, VGA, DisplayPort, or other audio and video transfer technologies. For example, the wireless network connection can be a wireless local area network (WLAN) and can use Wi-Fi in any of its various standards.

In some implementations, each of the STBs 130, 140, 180 includes interfaces, controllers/processors, tuners, decoders, display engine, conditional access component, digital video recorder (DVR) (e.g., a hard drive), storage/memory, among other components. In some implementations, circuitry of the STB 130, 140, or 180 can perform the operations described herein. In some implementations, one or more processors of the STB 130, 140, or 180 can execute instructions stored in non-transitory computer-readable storage media to perform the operations described herein. The processors can be one or more microprocessors, CPUs, ASICs and/or one or more other integrated circuits. In some implementations, one or more of the STBs 130, 140, 180 is implemented as a single chip or a system on chip (SOC).

In some implementations, one or more STBs 130, 140, 180 can include a LTE module 135, 150. In some implementations, the LTE module can include a dangle 150 connected to the STB (e.g., 140) via a USB connection 145. In other implementation, the LTE module can be integrated within the STB (e.g., 130) and includes a LTE transceiver 135. The LTE module 135, 150, for example, can offer additional services to end users and to allow operators to use the LTE network for controlling information with the satellite company. In some implementations, the LTE module 135, 150 can include a subscriber identity module (SIM) card or module. In other implementations, the SIM card or module can be a separate component of the STB. The SIM card or module can identify and provide services, including security services, to the subscriber associated with the STB, when the LTE module 135, 150 is connected to a LTE network through the base station 190. In some implementations, the functions associated the SIM card or module are built directly into the LTE module. Base station 190 can include suitable logic, circuitry, interfaces, and/or code configured to receive voice, data and other content from a service provider and to transmit the voice, data and other content to end user equipment. In some implementations, the base station 190 can utilize the LTE standards and operate with signals in LTE frequency bands.

The LTE modules 135, 150 can include suitable logic, circuitry, interfaces, and/or code having communication capability via an air interface. The LTE modules 135, 150 can use frequency division duplex (FDD) and/or time division duplex (TDD) techniques to facilitate downlink and uplink transmissions. The LTE modules 135, 150 can receive LTE signals operating in LTE frequency bands from the base station 190. Table 1 illustrates example LTE frequency bands, in some implementations. In some implementations, the LTE frequency bands associated with the LTE modules 135, 150 can overlap with the transponder frequency bands of the signals sent by the ODU 115 via the cable 120 to the STBs. Table 2 illustrates example transponder frequency bands transmitted by the ODU 115 via the cable 120, in some implementations.

Table 1 illustrates example LTE frequency bands, in some implementations. In general, LTE networks are transmitted on bands from 450 Megahertz (MHz) to 3800 MHz.

TABLE 1

| LTE Band Number | Uplink (MHz) | Downlink (MHz) | Duplex Mode |
|---|---|---|---|
| 1 | 1920-1980 | 2110-2170 | FDD |
| 2 | 1850-1910 | 1930-1990 | FDD |
| 3 | 1710-1785 | 1805-1880 | FDD |
| 4 | 1710-1755 | 2110-2155 | FDD |
| 5 | 824-849 | 869-894 | FDD |
| 6 | 830-840 | 875-885 | FDD |
| 7 | 2500-2570 | 2620-2690 | FDD |
| 8 | 880-915 | 925-960 | FDD |
| ... | | | |
| 25 | 1850-1915 | 1930-1995 | FDD |
| 26 | 814-849 | 859-894 | FDD |
| 27 | 807-824 | 852-869 | FDD |
| 28 | 703-748 | 758-803 | FDD |
| ... | | | |
| 33 | 1900-1920 | 1900-1920 | TDD |
| 34 | 2010-2025 | 2010-2025 | TDD |
| 35 | 1850-1910 | 1850-1910 | TDD |
| 36 | 1930-1990 | 1930-1990 | TDD |
| ... | | | |

Table 2 illustrates example transponder frequency bands (satellite channels) on the coaxial cable, in some implementations. The table shows center frequency. Each band is approximately 46 MHz wide.

TABLE 2

| Output frequency Range | 950 MHz-2150 MHz |
|---|---|
| Frequency plan (channels) | 1. 974 MHz |
| | 2. 1025 MHz |
| | 3. 1076 MHz |
| | 4. 1127 MHz |
| | 5. 1178 MHz |
| | 6. 1229 MHz |
| | 7. 1280 MHz |
| | 8. 1331 MHz |
| | 9. 1382 MHz |
| | 10. 1433 MHz |
| | 11. 1484 MHz |
| | 12. 1535 MHz |
| | 13. 1586 MHz |
| | 14. 1637 MHz |
| | 15. 1688 MHz |

TABLE 2-continued

| Output frequency Range | 950 MHz-2150 MHz |
|---|---|
| | 16. 1739 MHz |
| | 17. 1790 MHz |
| | 18. 1841 MHz |
| | 19. 1892 MHz |
| | 20. 1943 MHz |
| | 21. 1994 MHz |
| | 22. 2045 MHz |
| | 23. 2096 MHz |

In some implementations, when a viewer requests a TV channel (e.g., CNN®, ESPN®) to watch or for other purposes (e.g., recording), the STB makes a request for a satellite channel (transponder frequency band) to the ODU. The ODU, responsive to the request, allocates a satellite channel from existing transponder frequency bands (e.g., the 23 transponder frequency bands or satellite channels as shown in Table 2 in some implementations) to the channel request and communicates the channel number to the STB. In these implementations, the STB does not allocate the satellite channel and cannot reject the satellite channel allocated by the ODU. The STB, responsive to receiving the allocated transponder frequency band, decodes the received audio, video, and data on the allocated frequency and presents the TV channel for display.

As can be seen from Table 1 and Table 2, some LTE frequency bands overlap with the transponder frequency bands. Thus, when a STB has a LTE module, interference can occur on overlapping frequency bands. In some implementations, the LTE transceiver of the STB can be within a few inches of the coaxial cable. In some implementations, the LTE module can transmit up to 23 dBm power on the uplink towards the base station, and as a result, the STB cannot decode the allocated satellite channel due to high in-band interferences. In some cases, when in-band interference occurs, filtering cannot remove any of it. The systems and methods described herein can allow STBs with LTE capability to function smoothly and seamlessly by handling the overlapping between the LTE frequency bands and the transponder frequency bands, as described herein below in more detail in relation to FIGS. 1-4.

Although FIG. 1 shows example components of system 100, in other implementations, system 100 can contain additional, different, fewer, and/or differently-arranged components than those depicted in FIG. 1. Furthermore, although FIG. 1 shows three STBs, system 100 can have only one, or two, four, or more STBs. The configuration and arrangement of each STBs, the ODU, the cable, the splitter, and the satellite antenna, etc. as shown in FIG. 1 are for illustrative purposes only and are not limiting.

Figure 2:
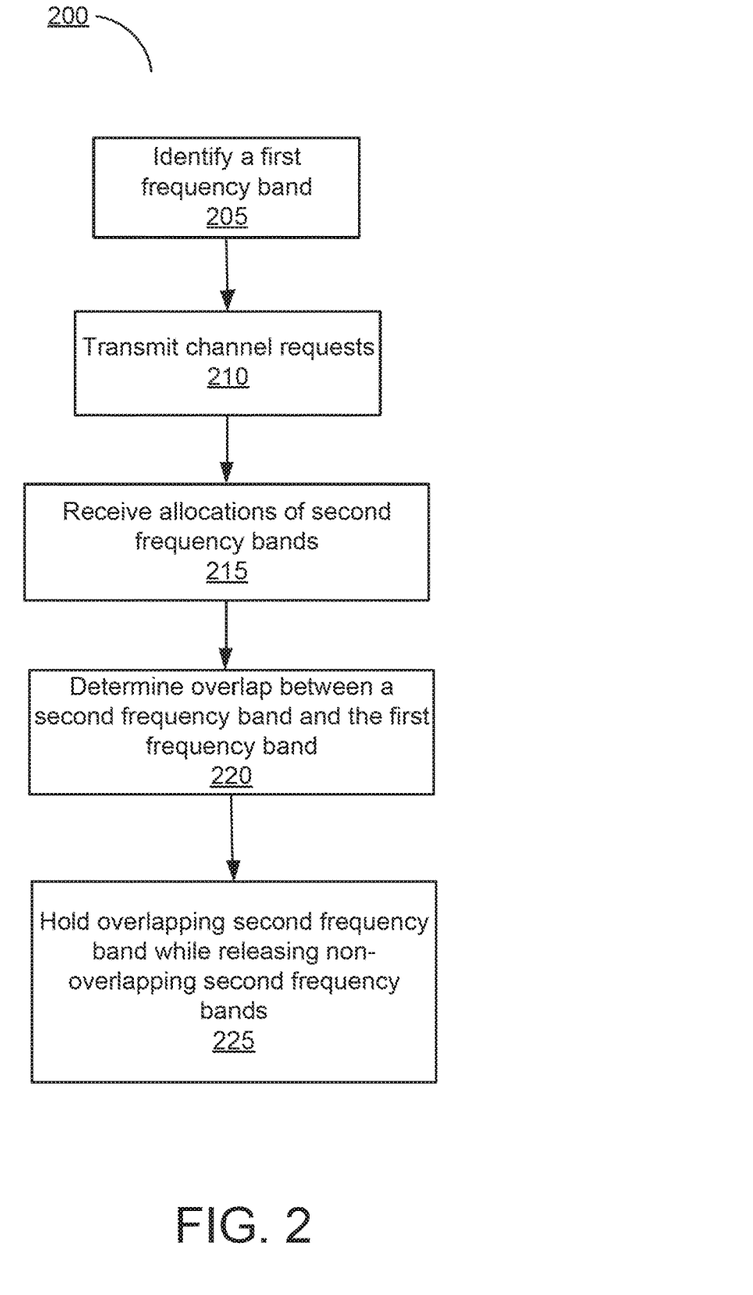
FIG. 2 is a flow diagram depicting an example flow of handling satellite channel and LTE coexistence, performed by a first device, according to an illustrative implementation.

FIG. 2 is a flow diagram depicting an example flow 200 of handling satellite channel and LTE coexistence performed by a first device, such as a STB. In brief overview, the flow 200 can include identifying, by a first device, at least one first frequency band (operation 205). The flow 200 can include transmitting, by the first device, a plurality of channel requests to a second device (operation 210). The flow 200 can include receiving, by the first device, allocations of a plurality of second frequency bands by the second device responsive to the plurality of channel requests (operation 215). The flow 200 can include determining, by the first device, that at least one second frequency band allocated responsive to at least one channel request overlaps with the at least one first frequency band (operation 220). The flow 200 can include, in response to determining that the at least one second frequency band overlaps with the at least one first frequency band, holding the at least one second frequency band while releasing, by the first device to the second device, second frequency bands other than the at least one second frequency band allocated responsive to the plurality of channel requests (operation 225).

Referring now to FIGS. 1 and 2 together, in further detail, the flow 200 can include identifying, by a first device, at least one first frequency band (operation 205). For example, the first device can include a STB (e.g., 130, 140) and the first frequency band can include a LTE frequency band. In some implementations, at boot time (e.g., when the STB is powered on, power recycle, or reset), a STB can scan for LTE networks associated with a LTE module (e.g., LTE transceiver 135 or LTE dangle 150) of the STB. For example, the STB 130 or the LTE transceiver 135 can scan the LTE networks. A service provider can deploy a number LTE bands in a specific area, such as the area where the customer premise including the STBs 130, 140, 180 locates. In some implementations, the number of LTE bands deployed by a service provider in an area generally does not exceed 2 primary bands. The STB can identify one or more LTE frequency bands based on the scanning of the LTE networks. For example, the STB 130 or the LTE transceiver 135 can identify one or more LTE frequency bands associated with a SIM module of the STB 130 or the LTE transceiver 135. As an example, in some implementations, the LTE frequency bands identified can be band 25 (1850 MHz-1915 MHz) and band 26 (814 MHz-849 MHz) as shown in Table 1. The STB can store the identified bands in a memory or storage.

The flow 200 can include transmitting, by the first device, a plurality of channel requests to a second device (operation 210). For example, the second device can include the ODU 115. In some implementations, upon identifying one or more LTE frequency bands, for example at boot time, the STB 130 can make a plurality of channel requests to the ODU 115. In some implementations, upon identifying the one or more LTE frequency bands in operation 205, the STB 130 can check a satellite channel table, such as Table 2 stored in the memory or storage of the STB 130. If the STB 130 identifies at least one of the satellite channel (transponder frequency band) overlaps with any of the identified LTE frequency band (operation 205), the STB makes the channel requests. If the STB does not identify any of the satellite channels overlaps with any of the identified LTE frequency bands, the STB does not make the channel requests because there is no interference issues between the LTE frequency band and the transponder frequency band. For instance, in the example above, the identified LTE frequency bands are band 25 and 26 in Table 1. Based on this, the STB can determine that channels 18 (1841 MHz) and 19 (1892 MHz) in Table 2 overlap with the LTE band 25, and that no channels in Table 2 overlaps with the LTE band 26. In other implementations, the STB makes the channel requests without checking the satellite channel table (e.g., the table is not available or accessible at the time).

In some implementations, the first device transmits or communicates the plurality of channel requests to the second device via a coax cable, such as the cable 120. For example, the STB 130 can communicate with the ODU 115 using Frequency shift keying (FSK), or digital satellite equipment control (DiSEqC), or other protocols via the cable 120. In some implementations, the plurality of channel requests made by the STB 130 causes a maximum number of the transponder frequency bands that are available for the ODU 115 to allocate to be allocated. For example, based on the information in Table 2, the STB 130 knows there are totally 23 satellite channels (or transponder frequency bands) available for the ODU 115 to allocate (e.g., at boot time). Therefore, the STB 130 can continue to make the requests until all the 23 satellite channels are allocated by the ODU 115. The STB 130 can make the channel requests in various ways, depending on implementations. For example, the STB 130 can request TV channels one by one by sending to the ODU 115 necessary information for a specific TV channel (e.g., satellite number, transponder number, program identifiers (PIDs), etc.). For example, when the STB 130 requests a TV channel corresponding to ESPN®, the STB 130 can send the corresponding satellite number, transponder number, and PID associated with ESPN®.

The flow 200 can include receiving, by the first device, allocations of a plurality of second frequency bands by the second device responsive to the plurality of channel requests (operation 215). In some implementations, the ODU 115, responsive to receiving the channel requests from the STB 130, allocates the available satellite channels (transponder frequency bands). For example, as shown in Table 2, the ODU 115 can allocate all 23 channels responsive to receiving the channel requests. In these implementations, regardless what method is followed by the ODU 115, the ODU 115 can eventually allocate all 23 channels, for example, available for the ODU 115 to allocate. Once the ODU 115 allocates a channel, the ODU 115 informs the STB 130. For example, the ODU 115 can communicate the channel number corresponding to the allocated transponder frequency band in Table 2 to the STB 130. The STB 130 then tunes to the frequency allocated by the ODU 115. In a normal situation (e.g., when a real channel request is made by a viewer), the STB 130 decrypts/decodes the streams on the allocated frequency. However, in the implementations as described herein, the STB 130 does not decrypt/decode the streams.

The flow 200 can include determining, by the first device, that at least one second frequency band allocated responsive to at least one channel request overlaps with the at least one first frequency band (operation 220). In some implementations, the STB 130 can determine if the transponder frequency band allocated to a specific channel request overlaps with the identified LTE frequency bands. Continuing with the example above, the identified LTE frequency bands are bands 25 and 26 in Table 1. Thus, the overlapping transponder frequency bands can be channels 18 and 19 in Table 2. In this example, the ODU 115 allocates channels 18 and 19 to the channel requests corresponding to CNN® and ESPN®, respectively. Continuing with this example, the STB 130 determines that the transponder frequency bands allocated to the channel requests for CNN® and ESPN® are overlapping bands.

The flow 200 can include, in response to determining that the at least one second frequency band overlaps with the at least one first frequency band, holding the at least one second frequency band while releasing, by the first device to the second device, second frequency bands other than the at least one second frequency band allocated responsive to the plurality of channel requests (operation 225). In some implementations, responsive to determining that one or more transponder frequency bands allocated by the ODU 115 overlap with the identified LTE frequency bands, the STB 130 holds those overlapping transponder frequency bands while releasing other transponder frequency bands that do not overlap with the identified LTE frequency bands. Continuing with the example above, the STB 130 determines that channels 18 and 19 in Table 2 overlap with the identified LTE frequency band 25. Channels 18 and 19 in Table 2, for example, are allocated by the ODU 115 to the channel requests for CNN® and ESPN® made in operation 210. Accordingly, the STB 130 holds or keeps the TV channels CNN® and ESPN® as if the viewer is watching or recording them. The STB 130 does not decode those two channels because those two channels are not actually requested by the viewer. In some implementations, the STB 130 holds the channels by marking them as in-use by the STB 130. In the meantime, the STB 130 releases or frees those transponder frequency bands that do not overlap with the identified LTE frequency bands. Continuing with the above example, the STB 130 releases TV channels corresponding to the channel requests that are allocated with the transponder frequency bands corresponding to satellite channels 1-17 and 20-23 in Table 2. For instance, if the channel request for CBS® is allocated with the satellite channel 3, the STB 130 releases CBS® as if the viewer no longer uses it. In some implementations, the STB 130 releases the TV channels (e.g., CBS®) by marking them as not-in-use. As a result, in this example, the ODU 115 can allocate channels 1-17 and 20-23 in Table 2 to subsequent (real) channel requests.

In some implementations, the STB 130 holds the overlapping transponder frequency bands until the STB 130 reboots (e.g., at a second boot time, for instance, when the STB 130 resets or has a power recycle). The operations described above can ensure, for example, when a viewer requests to watch (or record, etc.) a TV channel from the STB 130, the ODU 115 does not allocate a satellite channel (transponder frequency band) that could interference with the identified LTE frequency band associated with the STB 130, because the overlapping satellite channels have already been allocated.

Figure 3A:
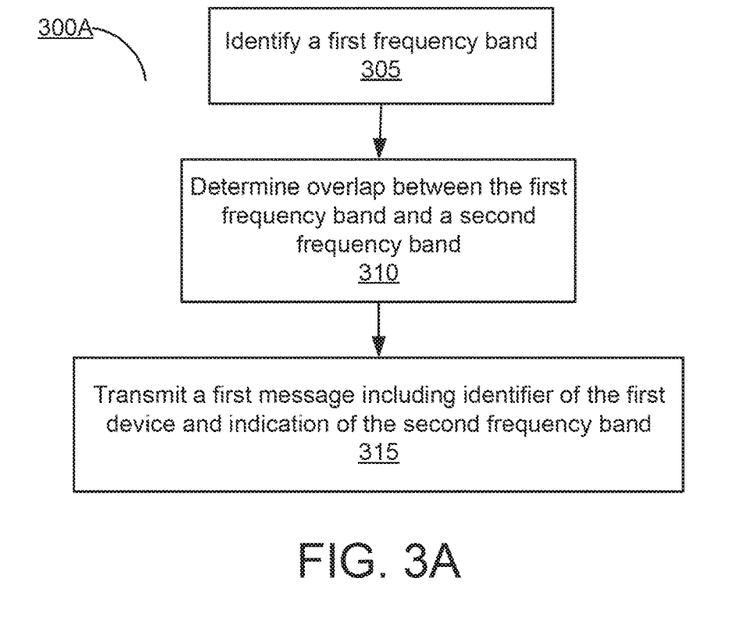
FIG. 3A is a flow diagram depicting an example flow of handling satellite channel and LTE coexistence, performed by a first device, according to an illustrative implementation.

FIG. 3A is a flow diagram depicting an example flow 300A of handling satellite channel and LTE coexistence performed by a first device, such as a STB. In brief overview, the flow 300A can include identifying, by a first device, at least one first frequency band (operation 305). The flow 300A can include determining, by the first device, that at least one second frequency band of a plurality of second frequency bands overlaps with the at least one first frequency band (operation 310). The flow 300A can include, in response to determining that the at least one second frequency band overlaps with the at least one first frequency band, transmitting, by the first device to a second device, a first message including an identifier of the first device and an indication of the at least one second frequency band (operation 315).

Referring now to FIGS. 1 and 3A together, in further detail, the flow 300A can include identifying, by a first device, at least one first frequency band (operation 305). For example, the first device can include a STB (e.g., 130, 140) and the first frequency band can include a LTE frequency band. In some implementations, at boot time (e.g., when the STB is powered on, power recycle, or reset), a STB can scan for LTE networks associated with a LTE module (e.g., LTE transceiver 135 or LTE dongle 150) of the STB. For example, the STB 130 or the LTE transceiver 135 can scan the LTE networks. A service provider can deploy a number of LTE bands in a specific area, such as the area where the customer premise including the STBs 130, 140, 180 locates. In some implementations, the number of LTE bands deployed by a service provider in an area generally does not exceed 2 primary bands. The STB can identify one or more LTE frequency bands based on the scanning of the LTE networks. For example, the STB 130 or the LTE transceiver 135 can identify one or more LTE frequency bands associated with a SIM module of the STB 130 or the LTE transceiver 135. As an example, in some implementations, the LTE frequency bands identified, can be band 25 (1850 MHz-1915 MHz) and band 26 (814 MHz-849 MHz) as shown in Table 1. The STB can store the identified bands in a memory or storage.

The flow 300A can include determining, by the first device, that at least one second frequency band of a plurality of second frequency bands overlaps with the at least one first frequency band (operation 310). For example, the second frequency bands can include transponder frequency bands as illustrated in Table 2. In some implementations, responsive to identifying the at least one LTE frequency band in operation 305, the STB 130 checks if the identified LTE frequency band overlaps with any of the transponder frequency bands that can be allocated by an ODU 115. For example, the STB 130 can check a satellite channel table, such as Table 2 stored in the memory or storage of the STB 130. If the STB 130 identifies at least one of the satellite channels (transponder frequency bands) overlaps with any of the identified LTE frequency bands (operation 305), the STB 130 determines there is an overlap. For instance, in the example above, the identified LTE frequency bands are band 25 and 26 in Table 1. Based on this, the STB 130 can determine that channels 18 (1841 MHz) and 19 (1892 MHz) in Table 2 overlap with the LTE band 25, and that no channels in Table 2 overlaps with the LTE band 26.

The flow 300A can include, in response to determining that the at least one second frequency band overlaps with the at least one first frequency band, transmitting, by the first device to a second device, a first message including an identifier of the first device and an indication of the at least, one second frequency band (operation 315). For example, the second device can include the ODU 115. In some implementations, responsive to determining that at least one transponder frequency band overlaps with the identified LTE frequency band, the STB generates a message. The message can be generated according to industrial standards, for example using protocols such as FSK and/or DiSEqC. The message can include a header and a payload. In some implementations, the header of the message can include an identifier of the STB 130 and the payload of the message can include an indication of the one or more overlapping transponder frequency bands determined in operation 310. For example, the indication of the transponder frequency band can be a channel number as shown in Table 2 or the actual value of the frequency band as shown in Table 2. For instance, if satellite channels 18 and 19 are determined, as the overlapping transponder frequency bands, the indication can be either the channel numbers 18 and 19 or the values of the corresponding transponder frequency bands (e.g., 1841 MHz and 1892 MHz). In some implementations, both the identifier of the STB 130 and the indication of the overlapping transponder frequency bands can be included in the payload.

In some implementation, the message does not include the identifier of the STB 130 (the first device) because the ODU 115 can identify the source of the message by methods other than the message itself. In some implementations, instead of including the indication of the at least one second frequency band, the message includes the indication of the at least one first frequency band because the ODU 115 (the second device) can map the at least one first frequency band to one or more corresponding second frequency bands. In some implementations, the message includes both the at least one first frequency band and at least one second frequency band. In some implementations, after generating the first message, the STB 130 transmits the message to the ODU 115 via the cable 120. For example, the message can be communicated to the ODU 115 using protocols such as FSK and/or DiSEqC.

Figure 3B:
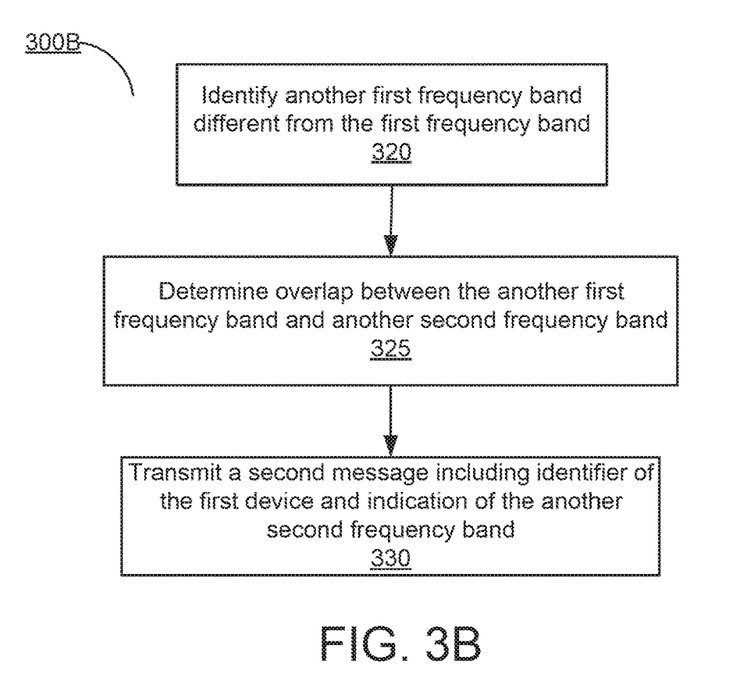
FIG. 3B is a flow diagram depicting an example flow of handling satellite channel and LTE coexistence, performed by a first device, according to an illustrative implementation.

FIG. 3B is a flow diagram depicting an example flow 300B of handling satellite channel and LTE coexistence performed by a first device, such as a STB. The flow 300B can include dynamically identifying, by the first device, another first frequency band different from the at least one first frequency band (operation 320). The flow 300B can include determining, by the first device, that another second frequency band of the plurality of second frequency bands overlaps with the another first frequency band, and the another second frequency band is different from the at least one second frequency band (operation 325). The flow 300B can include, transmitting, by the first device to the second device, a second message including the identifier of the first device and an indication of the another second frequency band (operation 330).

Referring now to FIGS. 1, 3A and 3B together, in further detail, the flow 300B can include dynamically identifying, by the first device, another first frequency band different from the at least one first frequency band (operation 320). In some implementations, when the LTE frequency bands changes (e.g., the service provider deploys another list of LTE frequency bands to the area), the STB 130 or the LTE transceiver 135 of the STB can detect such a change. For example, the STB 130 can compare the previously identified LTE frequency bands stored in the memory with the newly identified LTE frequency bands and determine any changes. If a change is determined, the STB 130 replaces the stored LTE frequency bands with the newly identified frequency bands.

The flow 300B can include determining, by the first device, that another second frequency band of the plurality of second frequency bands overlaps with the another first frequency band, and the another second frequency band is different from the at least one second frequency band (operation 325). In some implementations, responsive to the LTE frequency band has been changed, the STB 130 checks if the newly identified LTE frequency band overlaps with any of the transponder frequency bands that can be allocated by the ODU 115. For example, the STB 130 can compare the newly identified LTE frequency band with the transponder frequency bands stored in the Table 2. If the STB 130 identifies any of the transponder frequency bands listed in the table overlaps with the newly identified LTE frequency band, the STB 130 determines that there is an overlap. In some implementations, the STB 130 determines that the newly determined overlapping transponder frequency band is different from the previously determined overlapping transponder frequency band (the overlapping second frequency band determined in operation 310 in FIG. 3A). For example, STB 130 can store the previously determined overlapping transponder frequency bands in memory or storage such that any newly determined overlapping transponder frequency band can be compared with them to determine if the overlapping transponder frequency bands have been, changed.

The flow 300B can include, transmitting, by the first device to the second device, a second message including the identifier of the first device and an indication of the another second frequency band (operation 330). For example, the STB 130 can generate a second message similar to the first message as described herein above in relation to FIG. 3A. In some implementations, after generating the second message, the STB 130 transmits the second message to the ODU 115 via the cable 120. In some implementations, the second message is generated and transmitted to the ODU 115 as long as there is a change in the overlapping transponder frequency bands. For example, if the previously determined overlapping transponder frequency bands are satellite channels 18 and 19 in Table 2 (operation 310 in FIG. 3A) and newly determined overlapping transponder frequency bands are satellite channels 19 and 20, a second message is generated and transmitted to the ODU 115 to inform the ODU 115 of the overlapping transponder frequency bands of satellite channels 19 and 20. In another case, even if the newly identified LTE frequency band does not overlap with any transponder frequency bands that the ODU 115 can allocate (e.g., any bands, in Table 2), as long as there is a previously determined overlapping transponder frequency band, the STB 130 sends a message to the ODU 115 to inform the change. For example, the previously determined overlapping transponder frequency bands are satellite channels 18 and 19 (operation 310 in FIG. 3A), and newly identified LTE bands are band 27 (807 MHz-824 MHz) and band 28 (703 MHz-748 MHz) in Table 1. In this example, no transponder frequency bands in Table 2 overlaps with LTE band 27 or 28. However, because there are previously determined overlapping transponder frequency bands (e.g., satellite channels 18 and 19), the STB 130 still sends a message to the ODU 115 to inform the ODU 115 that the overlapping transponder frequency band for the STB 130 has been changed. In some implementations, the STB 130 can generate a message with a NULL indicator (or other special values) in the place of the overlapping transponder frequency bands. When the ODU 115 receives a message including a NULL indicator (or other special values) as the overlapping transponder frequency bands, the ODU 115 clears the previously stored overlapping transponder frequency bands associated with this STB.

Figure 4A:
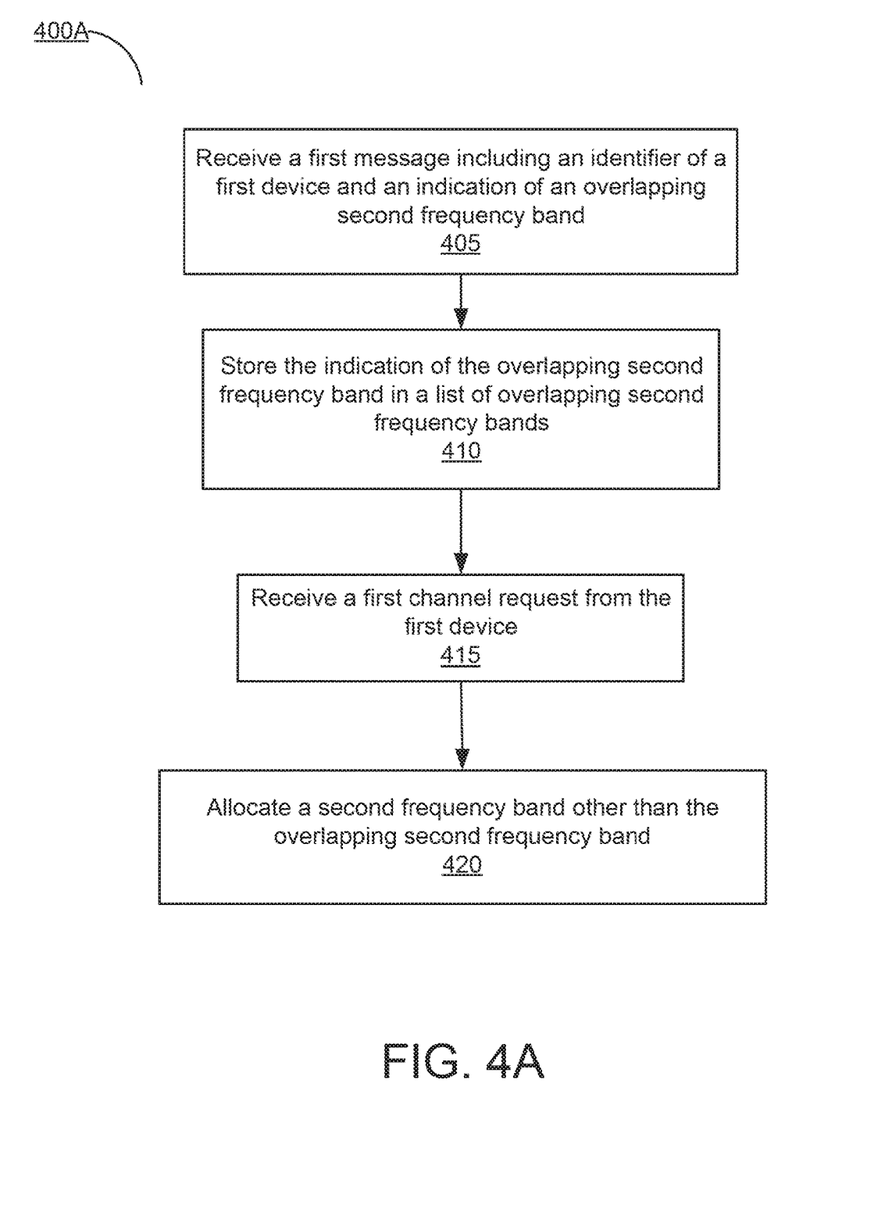
FIG. 4A is a flow diagram depicting an example flow of handling satellite channel and LTE coexistence, performed by a second device, according to an illustrative implementation.

FIG. 4A is a flow diagram depicting an example flow 400A of handling satellite channel and LTE coexistence performed by a second device, such as an ODU. In brief overview, the flow 400A can include receiving, by a second device from a first device, a first message including an identifier of the first device and an indication of at least one second frequency band, and the at least one second frequency band overlaps with at least one first frequency band (operation 405). The flow 400A can include storing, by the second device, the indication of the at least one second frequency band in a list of overlapping second frequency bands, and the at least one second frequency band is associated with the first device (operation 410). The flow 400 can include receiving a first channel request from the first device (operation 415). The flow 400 can include, in response to receiving the first channel request from the first device, allocating, by the second device, from a plurality of second frequency bands, a second frequency band other than the at least one second frequency band using the identifier of the first device and the indication of the at least one second frequency band (operation 420).

Referring now to FIGS. 1 and 4A together, in further detail, the flow 400 can include receiving, by a second device from a first device, a first message including an identifier of the first device and an indication of at least one second frequency band, and the at least one second frequency band overlaps with at least one first frequency band (operation 405). For example, the first device can include a STB and the second device can include an ODU. The first frequency band can include a LTE frequency band and the second frequency band can include a transponder frequency band. In some implementations, the ODU 115 can receive a message from the STB 130. The message can be generated by the STB 130 according to industrial standards, for example using protocols such as FSK and/or DiSEqC. The message can include a header and a payload. In some implementations, the header of the message can include an identifier of the STB 130, and the payload of the message can include an indication of one or more overlapping transponder frequency bands that overlap with at least one LTE frequency band associated with the STB 130. For example, the indication of the transponder frequency band can be a channel number as shown in Table 2 or the actual value of the frequency band as shown in Table 2. For instance, if satellite channels 18 and 19 in Table 2 are the overlapping transponder frequency bands, the indication can be either the channel numbers 18 and 19 or the values of the corresponding transponder frequency bands (e.g., 1841 MHz and 1892 MHz). In some implementations, both the identifier of the STB 130 and the indication of the overlapping transponder frequency bands can be included in the payload.

In some implementation, the message does not include the identifier of the STB 130 (the first device) because the ODU 115 can identify the source of the message by methods other than the message itself. In some implementations, instead of including the indication of the at least one second (transponder) frequency band, the message includes the indication of one or more first (LTE) frequency bands because the ODU 115 (the second device) can map the LTE frequency bands to the corresponding transponder frequency bands. In some implementations, the message includes both the LTE frequency hands and the transponder frequency bands. In some implementations, the message can be received by the ODU 115 from the STB 130 via a coaxial cable (e.g. cable 120) using protocols such as FSK and/or DiSEqC.

The flow 400A can include storing, by the second device, the indication of the at least one second frequency band in a list of overlapping second frequency bands, and the at least one second frequency band is associated with the first device (operation 410). In some implementations, the ODU 115 maintains a list of overlapping transponder frequency bands and stores the list in a memory or storage of the ODU 115. In some implementations, the list includes all entry for each STB associated with the ODU 115, and the entry indicates all the overlapping transponder frequency bands associated with the particular STB. In other implementations, the list uses the overlapping transponder frequency bands as index, and lists all the STBs associated with a particular overlapping transponder frequency band. Thus, each overlapping transponder frequency band in the list is associated with at least one STB in these implementations. For example, if the message received from the STB 130 indicates that satellite channels 18 and 19 are overlapping transponder frequency bands, the list can include entries indicating channels 18 and 19 are overlapping transponder frequency bands associated with the STB 130. Other implementations of the overlapping transponder frequency band list are possible.

The flow 400A can include receiving a first channel request from the first device (operation 415). For example, the ODU 115 can receive a channel request for ESPN® from the STB 130. The flow 400A can include, in response to receiving the first channel request from the first device, allocating, by the second device, from a plurality of second frequency bands, a second frequency band other than the at least one second frequency band based on the identifier of the first device and the indication of the at least one second frequency band (operation 420). In some implementations, the ODU 115 can allocate a satellite channel (transponder frequency band), for example from Table 2, responsive to the channel request from the STB 130. In these implementations, prior to allocating the satellite channel, the ODU 115 checks the list of overlapping frequency bands, stored in the memory or storage to make sure itself does not allocate any overlapping transponder frequency bands associated with the STB 130. As noted above, the list of overlapping transponder frequency bands can store for each STB the transponder frequency bands that overlap with the LTE frequency bands associated with the LTE module of the particular STB. For example, if the list indicates that channels 18 and 19 are associated with the STB 130 (this information can be obtained based on the first message received in operation 405), the ODU 115 does not allocate channel 18 or 19 to the channel request even if channels 18 and 19 are available for allocation.

Figure 4B:
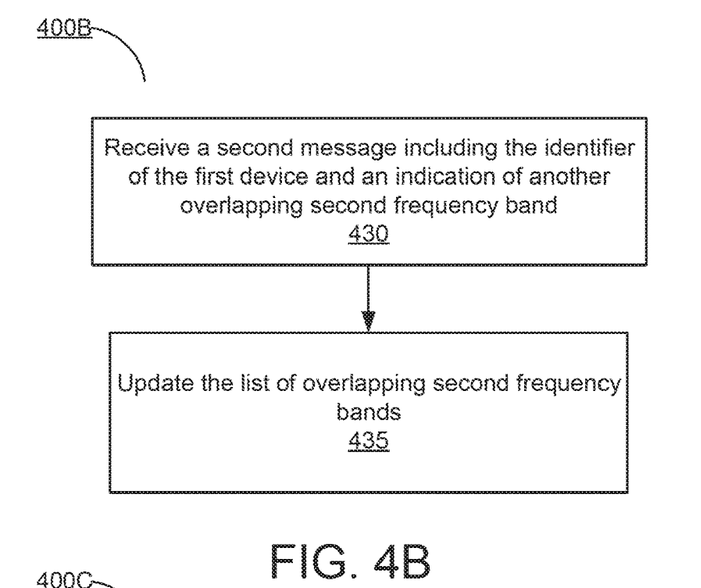
FIG. 4B is a flow diagram depicting an example flow of handling satellite channel and LTE coexistence, performed by a second device, according to an illustrative implementation.

FIG. 4B is a flow diagram depicting an example flow 400B of handling satellite channel and LTE coexistence performed by a second device, such as an ODU. In brief overview, the flow 400B can include receiving a second message from the first device, the second message including the identifier of the first device and an indication of another second frequency band different from the at least one second frequency band (operation 430). The flow 400B can include updating the list of overlapping second frequency bands in response to receiving the second message (operation 435).

Referring now to FIGS. 1, 4A and 4B together, in further detail, the flow 400B can include receiving a second message from the first device, the second message including the identifier of the first device and an indication of another second frequency band different from the at least one second frequency band (operation 430). In some implementations, the ODU 115 can receive an updated message (e.g., a message received after the first message) from the STB 130, which includes an indication of one or more transponder frequency bands that overlap with one or more LTE frequency bands associated with the STB 130. As described herein above in relation to operation 320 of FIG. 3B, the LTE frequency bands deployed to an area can be changed by the service provider. In such a case, the STB 130 can send an updated (second) message to the ODU 115 with the updated overlapping transponder frequency bands, if any. The second message can be similar to the first message as described above in relation to FIG. 4A.

The flow 400B can include updating the list of overlapping second frequency bands in response to receiving the second message (operation 435). In some implementations, responsive to receiving the second message from the STB 130, the ODU 115 can update the list of overlapping transponder frequency bands for the STB 130. For example, if the previous overlapping transponder frequency bands for the STB 130 stored in the list are satellite channels 18 and 19 (Table 2), and the second message includes an indication of channels 3 and 6 as the new overlapping transponder frequency bands, the ODU 115 updates the list by replacing channels 18 and 19 with channels 3 and 6 for STB 130. In another example, the second message can indicate that there is no overlapping, transponder frequency bands for the STB 130 now (e.g., by a NULL indicator, as described herein above in relation to FIG. 3B), the ODU 115 can, either update the list by replacing channels 18 and 19 with an indicator of NULL (or other indicators) for STB 130 or remove any reference to the STB 130 from the list.

Figure 4C:
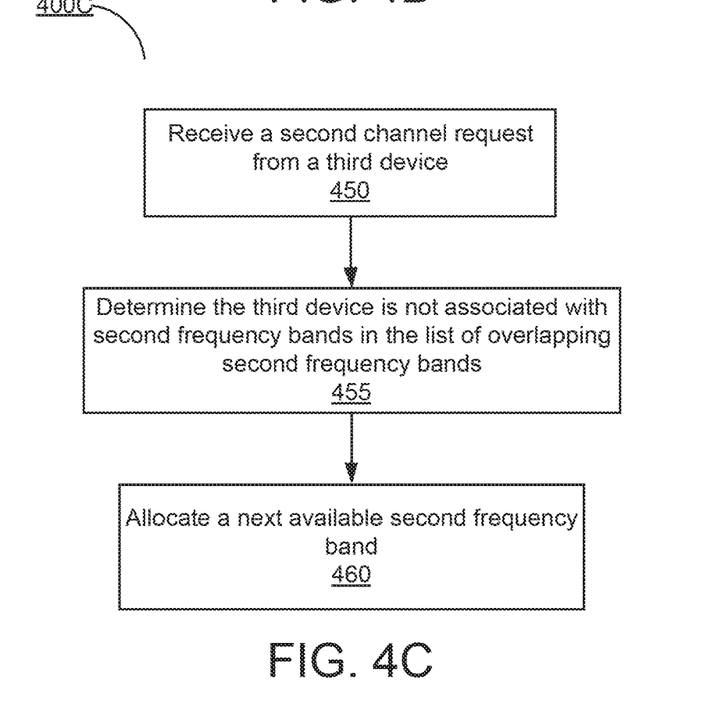
FIG. 4C is a flow diagram depicting an example flow of handling satellite channel and LTE coexistence, performed by a second device, according to an illustrative implementation.

FIG. 4C is a flow diagram depicting an example flow 400C of handling satellite channel and LTE coexistence performed by a second device, such as an ODU. In brief overview, the flow 400C can include receiving a second channel request from a third device (operation 450). The flow 400C can include determining that the third device is not associated with second frequency bands in the list of overlapping second frequency bands (operation 455). The flow 400C can include allocating a next available second frequency band from the plurality of second frequency bands responsive to the second channel request (operation 460).

Referring now to FIGS. 1, 4A and 4C together, in further detail, the flow 400C can include receiving a second channel request from a third device (operation 450). For example, the ODU 115 can receive a channel request for CNN® from the STB 180. As shown in FIG. 1, in some implementations, the STB 180 does not have a LTE module and thus does not receive signals operating in LTE frequency bands.

The flow 400C can include determining that the third device is not associated with second frequency bands in the list of overlapping second frequency bands (operation 455). In some implementations, the ODU 115 can determine that the particular STB which makes the channel request does not associated with any overlapping transponder frequency band by checking the list of overlapping second frequency bands. For example, in the case that the STB 180 in FIG. 1 makes a channel request, the STB 180 is not associated with any overlapping transponder frequency bands in the list because the STB 180 does not have a LTE module. As another example, if the LTE frequency bands associated with STB 130 are bands 27 and 28 in Table 1, the STB 130 is also not associated with any overlapping transponder frequency bands in the list because the LTE bands 27 and 28 do not overlap with any satellite channels in Table 2. In both cases, the ODU 115 can determine that the device that makes the channel request is not associated with any overlapping transponder frequency bands in the list of overlapping second frequency bands.

The flow 400C can include allocating a next available second frequency band from the plurality of second frequency bands responsive to the second channel request (operation 460). In some implementations, based, on the determination that the STB which makes the channel request is not associated with any overlapping transponder frequency bands (operation 455), the ODU 115 allocates the next available satellite channel (transponder frequency band) to the channel request. In other words, in these implementations, the ODU 115 can allocate any satellite channel (for example from Table 2) that has not been allocated, as in contrast with the example in operation 420 in FIG. 4A in which, even if an overlapping satellite channel associated with the STB making channel request is available for allocation, the ODU 115 does not allocate it in order to prevent interference with the corresponding LTE band associated with the particular STB. By allowing each STB sending a message to inform the ODU of the STB's overlapping transponder frequency bands and dynamically updating the list of overlapping transponder frequency bands, the systems and methods as described herein can handle the coexistence issue between satellite channels and LTE frequency bands seamlessly regardless of whether there is only one STB associated with the ODU or there are multiple STBs associated with the ODU. The ODU can allocate channels based on each STB's configuration. As in the example above, if the STB 180 does not have a LTE module, the ODU 115 is not restricted from allocating any available satellite channels in Table 2 when STB 180 makes a channel request, while the ODU 115 is restricted from allocating the overlapping transponder frequency bands associated with the STB 130 when the STB 130 makes a channel request.

As noted above, in some implementations, the number of LTE bands deployed by a service provider in an area generally does not exceed 2 primary bands. Thus, in these implementations, the number of transponder frequency bands (satellite channels) overlapping with LTE bands may generally be hunted to, for example, 4. As in the example with respect to Table 2, there can still be enough satellite channels available for the ODU to allocate, for example 19 or more. Thus, user experience is not impacted by the less number of available satellite channels that the ODU can allocate, while user experience can be enhanced by the smooth handling of the coexistence between the satellite channels and the LTE bands.

Figure 5A:
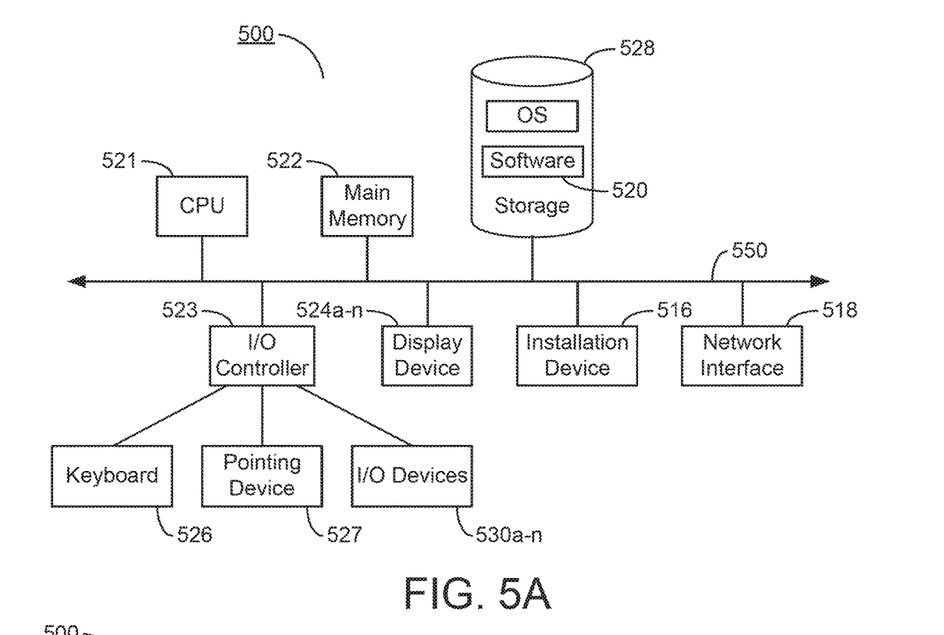
FIGS. 5A and 5B are block diagrams depicting implementations of computing devices useful in connection with the methods and systems described herein.
Figure 5B:
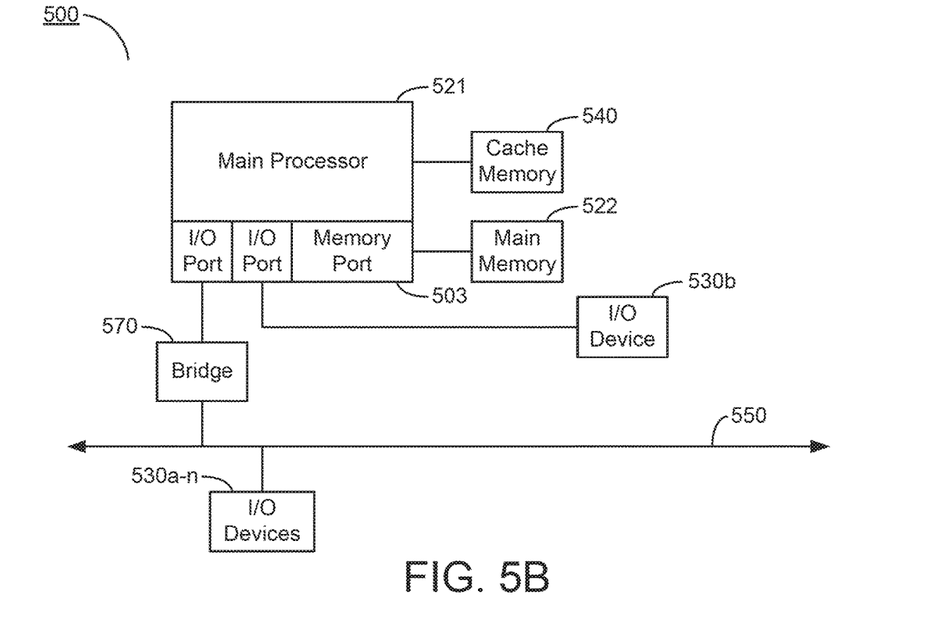

FIGS. 5A and 5B depict block diagrams of a computing device 500 useful for practicing an implementation of the STB 130, 140, 180 and/or ODU 115 as shown in FIG. 1. As shown in FIGS. 5A and 5B, each computing device 500 includes a central processing unit 521, and a main memory unit 522. As shown in FIG. 5A, a computing device 500 may include a storage device 528, an installation device 516, a network interface 518, an I/O controller 523, display devices 524a-524n, a keyboard 526 and a pointing device 527, such as a mouse. The storage device 528 may include, without limitation, an operating system and/or software. As shown in FIG. 5B, each computing device 500 may also include additional optional elements, such as a memory port 503, a bridge 570, one or more input/output devices 530a-530n (generally referred to using reference numeral 530), and a cache memory 540 in communication with the central processing unit 521.

The central processing unit 521 is any logic circuitry that responds to and processes instructions fetched from the main memory unit 522. In many implementations, the central processing unit 521 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 500 may be based on any of these processors, or any other processors capable of operating as described herein.

Main memory unit 522 may be one or more memory chips capable of storing data and allowing any storage location to be directly accessed by the microprocessor 521, such as any type or variant of Static random access memory (SRAM), Dynamic random access memory (DRAM), Ferroelectric RAM (FRAM), NAND Flash, NOR Flash and Solid State Drives (SSD). The main memory 522 may be based on any of the above described memory chips, or any other available memory chips capable of operating as described herein. In the implementation shown in FIG. 5A, the processor 521 communicates with main memory 522 via a system bus 550 (described in more detail below). FIG. 5B depicts an implementation of a computing device 500 in which the processor communicates directly with main memory 522 via a memory port 503. For example, in FIG. 5B the main memory 522 may be DRDRAM.

FIG. 5B depicts an implementation in which the main processor 521 communicates directly with cache memory 540 via a secondary bus, sometimes referred to as a backside bus. In other implementations, the main processor 521 communicates with cache memory 540 using the system bus 550. Cache memory 540 typically has a faster response time than main memory 522 and is provided by, for example, SRAM, BSRAM, or EDRAM. In the implementation shown in FIG. 5B, the processor 521 communicates with various I/O devices 530 via a local system bus 550. Various buses may be used to connect the central processing unit 521 to any of the I/O devices 530, for example, a VESA VL bus, an ISA bus, an EISA bus, a MicroChannel Architecture (MCA) bus, a PCI bus, a PCI-X bus, a PCI-Express bus, or a NuBus. For implementations in which the I/O device is a video display 524, the processor 521 may use an Advanced Graphics Port (AGP) to communicate with the display 524. FIG. 5B depicts an implementation of a computer 500 in which the main processor 521 may communicate directly with I/O device 530b, for example via HYPERTRANSPORT, RAPIDIO, or INFINIBAND communications technology. FIG. 5B also depicts an implementation in which local busses and direct communication are mixed: the processor 521 communicates with I/O device 530a using a local interconnect bus while communicating with I/O device 530b directly.

A wide variety of I/O devices 530a-530n may be present in the computing device 500. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 523 as shown in FIG. 5A. The I/O controller may control one or more I/O devices such as a keyboard 526 and a pointing device 527, e.g., a mouse or optical pen. Furthermore, an I/O device may also provide storage and/or an installation medium 516 for the computing device 500. In still other implementations, the computing device 500 may provide USB connections (not shown) to receive handheld USB storage devices such as the USB Flash Drive line of devices manufactured by Twintech Industry, Inc. of Los Alamitos, Calif.

Referring again to FIG. 5A, the computing device 500 may support any suitable installation device 516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 500 may further include a storage device, such as one or more hard disk drives or redundant arrays of independent disks, for storing an operating system and other related software, and for storing application software programs such as any program or software 520 for implementing (e.g., configured and/or designed for) the systems and methods described herein. Optionally, any of the installation devices 516 could also be used as the storage device. Additionally, the operating system and the software can be run from a bootable medium.

Furthermore, the computing device 500 may include a network interface 518 to interface to the network 504 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 811.11ad, CDMA, GSM, WiMax and direct asynchronous connections). In one implementation, the computing device 500 communicates with other computing devices 500' via any type and/or form of gateway or tunneling protocol such as Secure Socket Layer (SSL) or Transport Layer Security (TLS). The network interface 518 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

In some implementations, the computing device 500 may include or be connected to one or more display devices 524*a*-524*n*. As such, any of the I/O devices 530*a*-530*n* and/or the I/O controller 523 may include any type and/or form of suitable hardware, software, or combination of hardware and software to support, enable or provide for the connection and use of the display device(s) 524*a*-524*n* by the computing device 500. For example, the computing device 500 may include any type and/or form of video adapter, video card, driver, and/or library to interface, communicate, connect or otherwise use the display device(s) 524*a*-524*n*. In one implementation, a video adapter may include multiple connectors to interface to the display device(s) 524*a*-524*n*. In other implementations, the computing device 500 may include multiple video adapters, with each video adapter connected to the display device(s) 524*a*-524*n*. In some implementations, any portion of the operating system of the computing device 500 may be configured for using multiple displays 524*a*-524*n*. One ordinarily skilled in the art will recognize and appreciate the various ways and implementations that a computing device 500 may be configured to have one or more display devices 524*a*-524*n*.

In further implementations, an I/O device 530 may be a bridge between the system bus 550 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific implementation, method, and examples herein. The present methods and systems should therefore not be limited by the above described implementations, methods, and examples, but by all implementations and methods within the scope and spirit of the disclosure.

The invention claimed is:

1. A device, comprising:
one or more processors, one or more circuits, or any combination thereof configured to:
identify at least one first frequency band;
responsive to identifying the at least one first frequency band, transmit a plurality of channel requests to another device;
receive, from the another device, allocation of a maximum number of second frequency bands that are available for the another device to allocate after transmitting the plurality of channel requests to the another device; and
determine that at least one second frequency band among the second frequency bands allocated by the another device overlaps with the at least one first frequency band identified by the device.

2. The device of claim 1, wherein the at least one first frequency band comprises a Long-Term Evolution (LTE) frequency band, and the at least one second frequency band comprises a transponder frequency band.

3. The device of claim 1, further comprising the one or more processors, the one or more circuits, or the any combination thereof configured to:
responsive to determining that the at least one second frequency band overlaps with the at least one first frequency band, indicate that the at least one second frequency band is in-use by the device.

4. The device of claim 1, further comprising the one or more processors, the one or more circuits, or the any combination thereof configured to:
responsive to determining that the at least one second frequency band overlaps with the at least one first frequency band, indicate that the at least one second frequency band is in-use by the device without decoding a stream associated with the at least one second frequency band.

5. The device of claim 1, further comprising the one or more processors, the one or more circuits, or the any combination thereof configured to:
identify the at least one first frequency band by scanning first frequency bands at a boot time of the device.

6. The device of claim 1, wherein the allocation of the maximum number of the second frequency bands that are available for the another device to allocate is in response to the plurality of channel requests made by the device.

7. The device of claim 3, wherein the at least one second frequency band is indicated as in-use at a boot time of the device.

8. The device of claim 7, wherein the boot time is a first boot time, and the at least one second frequency band is indicated as in-use until a second boot time of the device.

9. A device comprising:
one or more processors, one or more circuits, or any combination thereof configured to:
identify at least one first frequency band;

determine that the at least one first frequency band overlaps with at least one second frequency band among a plurality of second frequency bands;

transmit, to another device, a first message comprising an indication of the at least one second frequency band;

identify another first frequency band different from the at least one first frequency band;

determine that the another first frequency band overlaps with another second frequency band among the plurality of second frequency bands, the another second frequency band different from the at least one second frequency band; and transmit, to the another device, a second message comprising an indication of the another second frequency band.

10. The device of claim 9, wherein the at least one first frequency band comprises a Long-Term Evolution (LTE) frequency band, and the at least one second frequency band comprises a transponder frequency band.

11. The device of claim 9, further comprising the one or more processors, the one or more circuits, or the any combination thereof configured to:

identify the at least one first frequency band by scanning first frequency bands associated with a Long-Term Evolution (LTE) module.

12. The device of claim 9, wherein the device comprises a set-top box (STB), and the another device comprises an Out Door Unit (ODU).

13. The device of claim 9, wherein the first message is transmitted to the another device via a coax cable.

14. A device comprising:

one or more processors, one or more circuits, or any combination thereof configured to:

receive, from another device, a first message comprising an indication of at least one second frequency band, the at least one second frequency band overlapping with at least one first frequency band; and in response to receiving the first message comprising the indication of the at least one second frequency band, store the indication of the at least one second frequency band in a list of overlapping second frequency bands, the at least one second frequency band being associated with the another device.

15. The device of claim 14, further comprising the one or more processors, the one or more circuits, or the any combination thereof configured to:

in response to receiving a channel request from the another device, allocate a second frequency band different from the at least one second frequency band.

16. The device of claim 14, further comprising the one or more processors, the one or more circuits, or the any combination thereof configured to:

receive a second message from the another device, the second message comprising an indication of another second frequency band different from the at least one second frequency band; and update the list of overlapping second frequency bands in response to receiving the second message.

17. The device of claim 14, further comprising the one or more processors, the one or more circuits, or the any combination thereof configured to:

receive a second message from the another device, the second message indicating no overlapping second frequency band associated with the another device; and update the list of overlapping second frequency bands by removing the indication of the at least one second frequency band from the list of overlapping second frequency bands.

18. The device of claim 14, wherein each second frequency band in the list of overlapping second frequency bands is associated with at least one device, the at least one device including the another device.

19. The device of claim 14, further comprising the one or more processors, the one or more circuits, or the any combination thereof configured to:

receive a channel request from a device other than the another device;

determine that the device other than the another device is not associated with second frequency bands in the list of overlapping second frequency bands; and allocate a next available second frequency band from a plurality of second frequency bands responsive to the channel request.

20. The device of claim 14, wherein the at least one first frequency band comprises a Long-Term Evolution (LTE) frequency band, and the at least one second frequency band comprises a transponder frequency band.

* * * * *